(12) United States Patent
Martz et al.

(10) Patent No.: US 12,071,886 B1
(45) Date of Patent: Aug. 27, 2024

(54) SYSTEM AND METHOD FOR ENGINE COLD START

(71) Applicant: Ford Global Technologies, LLC, Dearborn, MI (US)

(72) Inventors: Jason Martz, Canton, MI (US); Paul Joseph Tennison, West Bloomfield, MI (US); Brien Fulton, Bloomfield Hills, MI (US); Michiel J. Van Nieuwstadt, Ann Arbor, MI (US); Eric Kurtz, Dearborn, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/479,978

(22) Filed: Oct. 3, 2023

(51) Int. Cl.
| | |
|---|---|
| *F01N 3/10* | (2006.01) |
| *B01D 53/94* | (2006.01) |
| *F01N 3/20* | (2006.01) |
| *F01N 3/28* | (2006.01) |
| *F01N 3/32* | (2006.01) |

(Continued)

(52) U.S. Cl.
CPC ......... *F01N 3/208* (2013.01); *B01D 53/9431* (2013.01); *B01D 53/944* (2013.01); *B01D 53/9454* (2013.01); *B01D 53/9477* (2013.01); *B01D 53/9495* (2013.01); *F01N 3/106* (2013.01); *F01N 3/2013* (2013.01); *F01N 3/2892* (2013.01); *F01N 3/32* (2013.01); *F01N 3/36* (2013.01); *F01N 13/008* (2013.01); *B01D 2258/01* (2013.01); *F01N 2610/02* (2013.01); *F01N 2610/03* (2013.01);
(Continued)

(58) Field of Classification Search
CPC ............ B01D 53/9418; B01D 53/9431; B01D 53/944; B01D 53/9495; B01D 53/9494; B01D 53/9477; B01D 2251/2067; B01D 2255/1023; B01D 2255/50; B01D 2255/91; B01D 2257/404; B01D 2258/012; B01D 2258/01; F01N 3/106; F01N 3/2013; F01N 3/2066; F01N 3/2892; F01N 3/32; F01N 3/36; F01N 3/208; F01N 13/008; F01N 2610/03; F01N 2610/146; F01N 2610/02; F01N 2610/1453; F01N 2900/08; F01N 2900/1402; F01N 2900/1602; F02D 41/024; Y02T 10/12; Y02T 10/40
See application file for complete search history.

(56) References Cited

U.S. PATENT DOCUMENTS

| | | | | |
|---|---|---|---|---|
| 7,213,395 B2 * | 5/2007 | Hu | ........................ | F01N 3/2073 60/303 |
| 8,404,011 B2 * | 3/2013 | Doring | ...................... | F01N 3/22 422/177 |

(Continued)

OTHER PUBLICATIONS

Martz, J. et al., "System and Method for Engine Cold Start," U.S. Appl. No. 18/295,440, filed Apr. 4, 2023, 40 pages.

*Primary Examiner* — Dapinder Singh
(74) *Attorney, Agent, or Firm* — Vincent Mastrogiacomo; McCoy Russell LLP (57) ABSTRACT

Methods and systems for reducing emissions of an internal combustion engine are described. In one example, an electric heater and a selective reduction catalyst are positioned in a passage downstream of a combustor where urea may be injected to the selective reduction catalyst to reduce NOx emissions that may be generated by the combustor.

8 Claims, 4 Drawing Sheets

(51) Int. Cl.
  *F01N 3/36* (2006.01)
  *F01N 13/00* (2010.01)
(52) U.S. Cl.
  CPC .................. *F01N 2610/146* (2013.01); *F01N 2900/1402* (2013.01); *F01N 2900/1602* (2013.01)

(56) References Cited

U.S. PATENT DOCUMENTS

| | | | |
|---|---|---|---|
| 8,549,845 B2* | 10/2013 | Iwamoto | B01J 29/7615 |
| | | | 60/289 |
| 10,641,153 B1 | 5/2020 | Harris | |
| 11,506,136 B1 | 11/2022 | Harris et al. | |
| 2005/0011184 A1* | 1/2005 | Price | F02B 37/164 |
| | | | 60/289 |

* cited by examiner

SYSTEM AND METHOD FOR ENGINE COLD START

FIELD

The present description relates generally to methods and systems for starting an internal combustion engine.

BACKGROUND/SUMMARY

A combustor may be installed in an engine exhaust system in parallel with an engine and upstream of engine exhaust after treatment devices. The combustor may heat the engine exhaust after treatment devices so that engine emissions may be reduced. However, the combustor may also generate select emissions (e.g., CO, HC, and NOx) and these emissions may make it to atmosphere without being converted by the engine exhaust after treatment devices. Thus, while the combustor may help to increase the efficiency of converting engine emissions, it may result in untreated combustor emissions.

The inventors herein have recognized the above-mentioned disadvantages and have developed an exhaust system for an internal combustion engine, comprising: a combustor air pump selectively supplying air to a combustor located along a first passage; a bypass passage and a bypass valve arranged in parallel with the combustor; a three-way valve positioned downstream of the combustor along the first passage; an electric heater positioned along a second passage downstream of the three-way valve; an oxidation catalyst or a three-way catalyst positioned along the second passage downstream of the electric heater; a urea injector positioned along the second passage downstream of the oxidation catalyst or the three-way catalyst; a selective reduction catalyst (SCR) positioned along the second passage downstream of the oxidation catalyst or the three-way catalyst; a third passage arranged in parallel with the second passage the third passage coupled to the second passage and entering a fourth passage, the fourth passage extending to an engine exhaust passage and positioned upstream of a group of after treatment devices in the engine exhaust passage.

By arranging an electric heater and a selective reduction catalyst downstream of a combustor, it may be possible to provide the technical result of lowering unprocessed combustor emissions so that engine after treatment devices may be heated prior to an engine start without releasing larger amounts of NOx, CO, and HC. In particular, combustor emissions after treatment devices may be heated to a threshold temperature via an electric heater so that combustor emissions products may be processed when a combustor is subsequently activated. Heat from the combustor may in turn activate engine after treatment devices before the engine is activated. Thus, combustor and engine emissions may be processed via separate devices so that emissions are processed with higher efficiency. In addition, because the combustor emissions are processed via a selective reduction catalyst, which may be more tolerant of higher temperatures than some other types of after treatment devices, the combustor may generate higher gas temperatures and supply these gases to engine after treatment devices. The higher gas temperatures may reduce engine after treatment device heating time and lower tailpipe emissions.

The present description may provide several advantages. In particular, the approach may lower tailpipe emissions via lowering combustor emissions. In addition, the approach may allow higher gas temperatures to be generated by a combustor and reach engine after treatment devices, thereby reducing after treatment device heating time. Further, since the approach may tolerate higher temperatures, it may increase system robustness.

The above advantages and other advantages, and features of the present description will be readily apparent from the following Detailed Description when taken alone or in connection with the accompanying drawings.

It is to be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
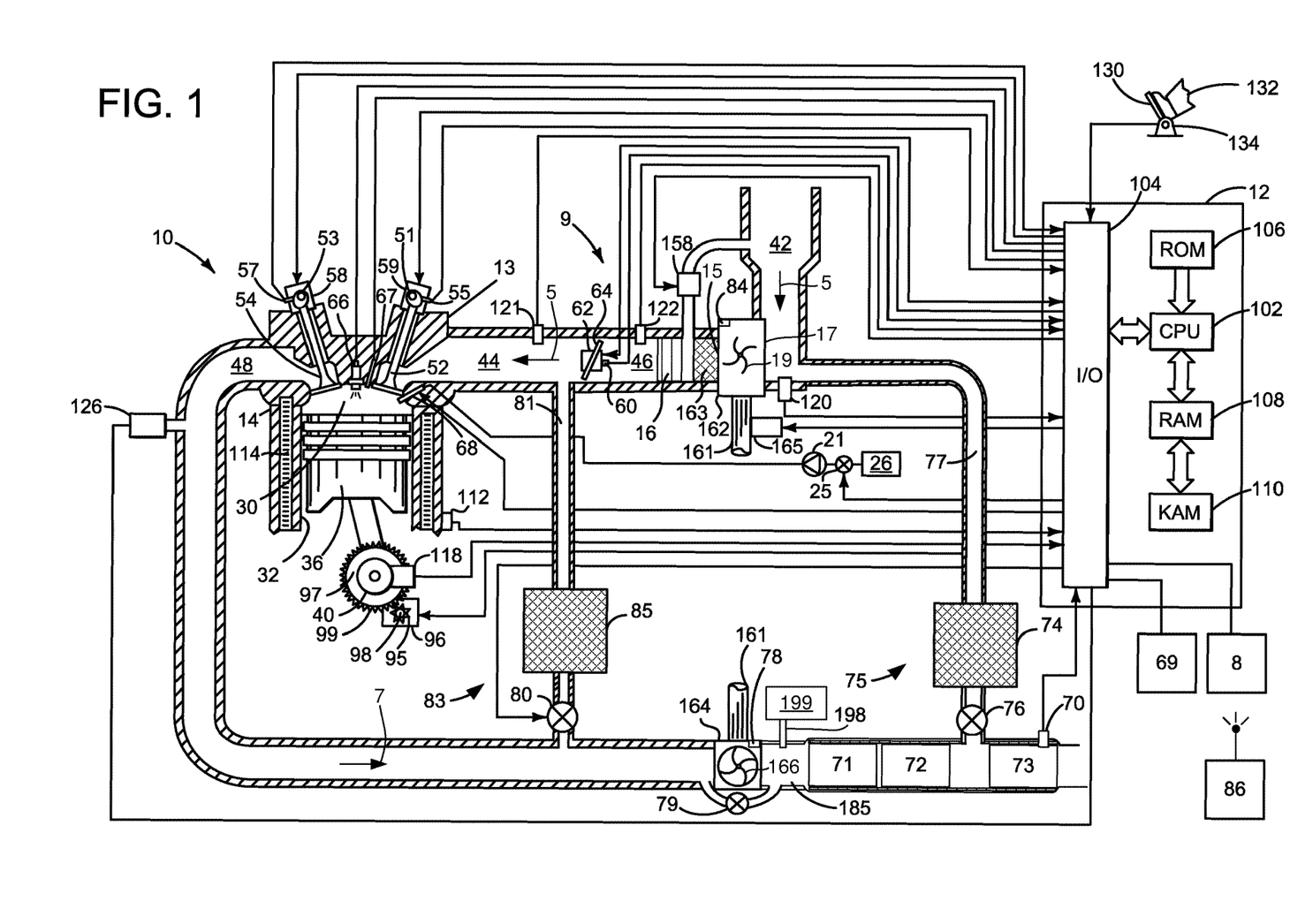
FIG. 1 shows a detailed schematic depiction of an example engine.
Figure 2:
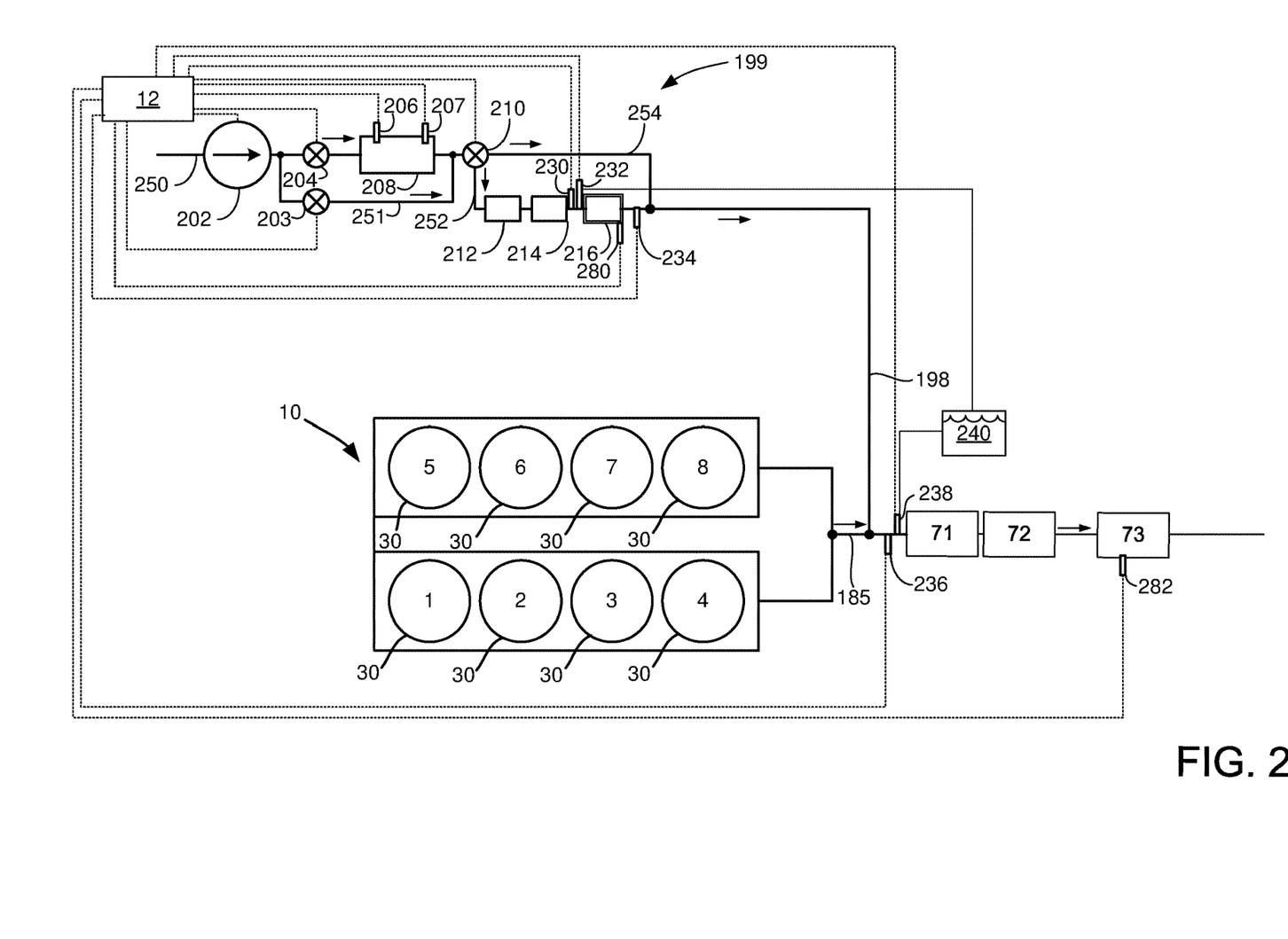
FIG. 2 shows a schematic view of an example exhaust system configurations for the example engine of FIG. 1.
Figure 3:
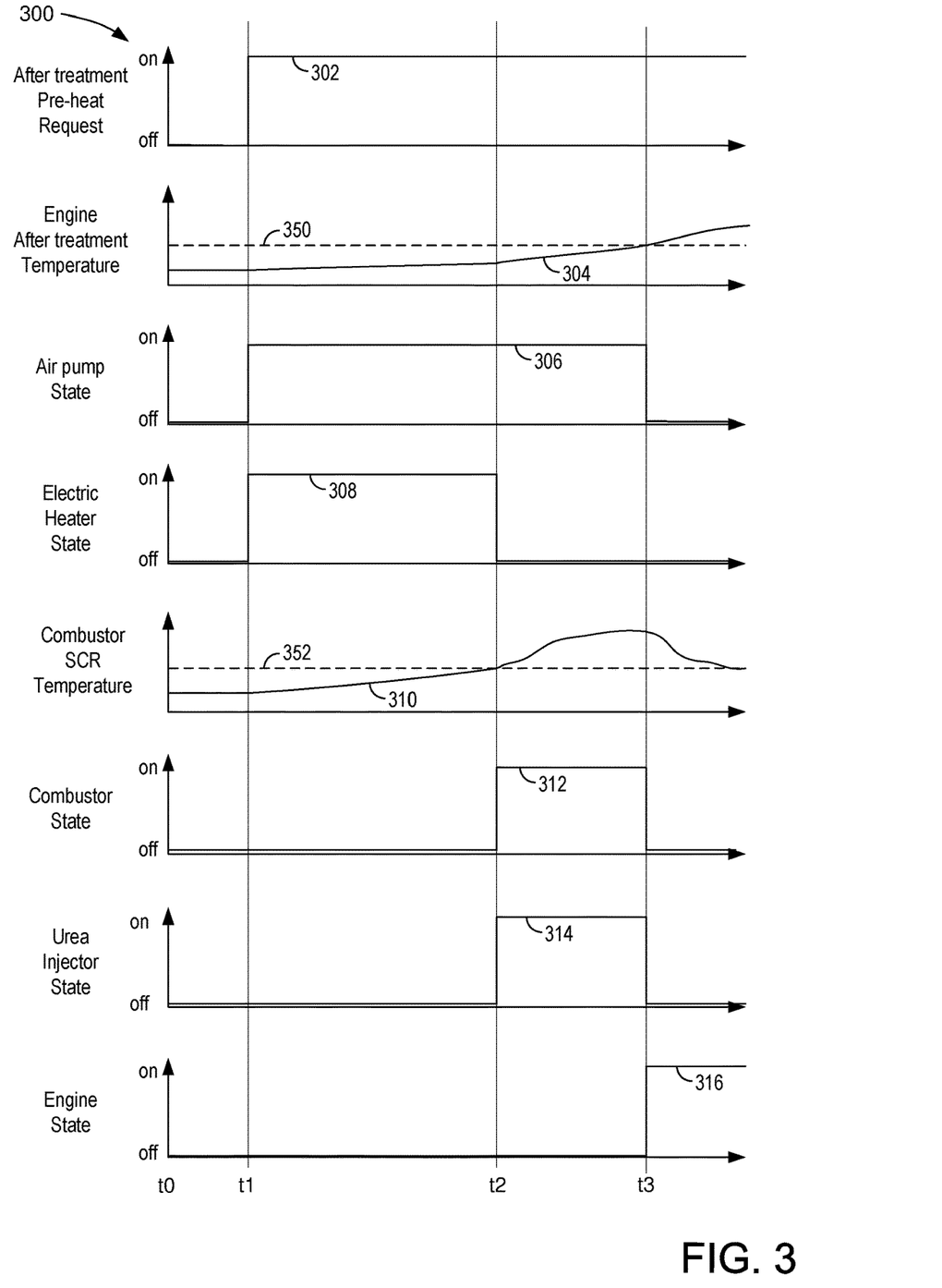
FIG. 3 shows an example operating sequence according to the method of FIG. 4.
Figure 4:
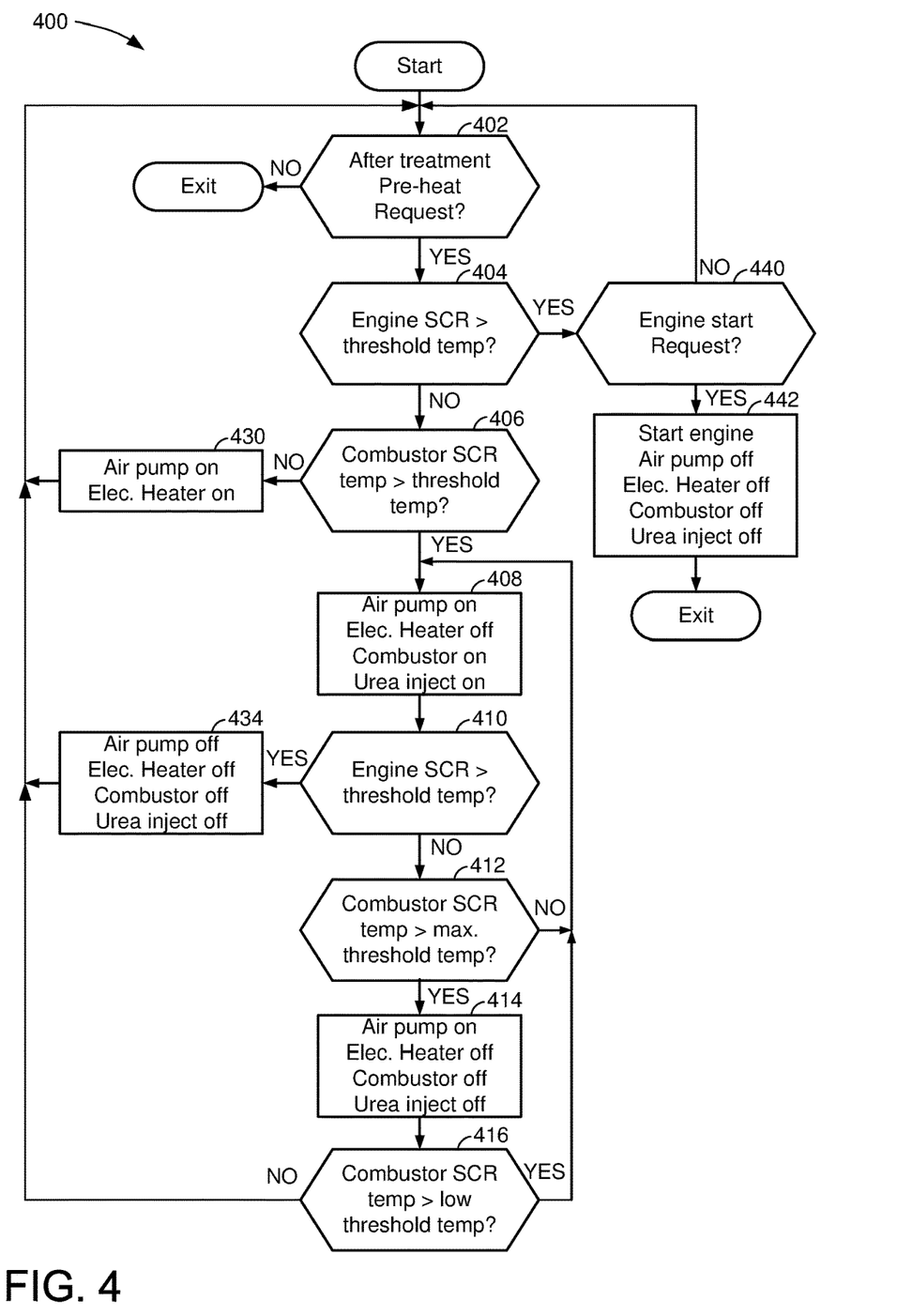
FIG. 4 shows a flowchart of a method for operating an engine and a combustor.

The present description is related to operating an engine and exhaust system after treatment devices before and during a cold engine start as well as during operating conditions when heat output of the engine is low. An example engine is shown in FIG. 1. An example exhaust system for the engine of FIG. 1 is shown in FIG. 2. An example operating sequence according to the method of FIG. 4 and the systems of FIGS. 1 and 2 is shown in FIG. 3. A method for operating the engine and after treatment system is shown in FIG. 4.

Referring to FIG. 1, internal combustion engine 10, comprising a plurality of cylinders, one cylinder of which is shown in FIGS. 1 and 2, is controlled by electronic engine controller 12. The controller 12 receives signals from the various sensors of FIGS. 1 and 2. The controller 12 also employs the various actuators of FIGS. 1 and 2 to adjust engine and vehicle operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59. Likewise, exhaust poppet valve 54 may be operated by a variable valve activating/deactivating actuator 58. Intake poppet valve 52 and exhaust poppet valve 54 may be deactivated and held in a closed position preventing flow into and out of cylinder 30 for one or more entire engine cycles (e.g. two engine revolutions), thereby deactivating cylinder 30. Flow of fuel supplied to cylinder 30 may also cease when cylinder 30 is deactivated.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, low pressure fuel pump (not shown), high pressure fuel pump 21, fuel pump volume control valve 25, and fuel rail (not shown).

Engine air intake system 9 includes intake manifold 44, throttle 62, grid heater 16, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. In some examples, a charge air cooler 163 may be provided. Further, an optional grid heater 16 may be provided to warm air entering cylinder 30 when engine 10 is being cold started. Compressor speed may be adjusted via adjusting a position of turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes 166 are in a closed position. Alternatively, waste gate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of turbine variable vane control actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet 17 of compressor 162, work performed on the air may be increased, thereby increasing the temperature of the air. Optional electric machine 165 is also shown coupled to shaft 161. Optional electric machine 165 may rotate compressor 162 when engine 10 is not rotating, when engine 10 is rotating at low speed (e.g., cranking speed such as 250 RPM), or when exhaust energy is low to provide additional boost. Air flows into engine 10 in the direction of arrows 5.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a band or chain. In one example, starter 96 is in a base state when not engaged to the engine crankshaft. An engine start/stop may be requested via human/machine interface (e.g., key switch, pushbutton, remote radio frequency emitting device, etc.) 69 or in response to vehicle operating conditions (e.g., foot lever position, driver demand pedal position, battery SOC, etc.).

Battery 8 may supply electrical power to starter 96 and electric machine 165. Controller 12 may monitor battery state of charge.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. In some examples, a universal Exhaust Gas Oxygen (UEGO) sensor 126 may be coupled to exhaust manifold 48 upstream of after treatment device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures optional glow plug 66 may convert electrical energy into thermal energy so as to create a hot spot next to one of the fuel spray cones of an injector in the combustion chamber 30. By creating the hot spot in the combustion chamber 30 next to sprayed fuel, it may be easier to ignite the fuel spray plume in the cylinder, releasing heat that propagates throughout the cylinder, raising the temperature in the combustion chamber, and enhance combustion. Cylinder pressure may be measured via optional pressure sensor 67, alternatively or in addition, sensor 67 may also sense cylinder temperature.

After treatment device 71 can include an oxidation catalyst and it may be followed by a diesel particulate filter (DPF) 72 and a selective catalytic reduction (SCR) catalyst 73, in one example. In another example, DPF 72 may be positioned downstream of SCR catalyst 73. Temperature sensor 70 provides an indication of SCR temperature. Exhaust flows in the direction of arrow 7. A combustor system 199 may supply heated air to after treatment devices via passage or conduit 198 upstream of after treatment devices 71-73 and downstream of turbine 164. Passage or conduit 198 may merge into exhaust passage or conduit 185.

Exhaust gas recirculation (EGR) may be provided to the engine via high pressure EGR system 83. High pressure EGR system 83 includes EGR valve 80, EGR passage 81, and EGR cooler 85. EGR valve 80 is a valve that closes or allows exhaust gas to flow from upstream of after treatment device 71 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of after treatment device 71 to a location upstream of compressor 162. Low pressure EGR system 75 may include an EGR cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing driver demand pedal position adjusted by human foot 132; a measurement of engine manifold pressure (MAP) from pressure sensor 121 coupled to intake manifold 44 (alternatively or in addition pressure sensor 121 may sense intake manifold temperature); boost pressure from pressure sensor 122 exhaust gas oxygen content from oxygen sensor 126; an engine position sensor from an engine position sensor 118 sensing crankshaft 40 position; a measurement of air mass entering the engine from sensor 120 (e.g., a hot wire air flow meter); and a measurement of throttle position from sensor 60. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

Controller 12 may receive data and requests from a remote device 86 that is external to the vehicle that the controller and engine are a part of. Remote device 86 may be a key fob, cloud server, phone, or other device. The requests may include an engine cold start preparation request, engine start request, and so on.

During operation, each cylinder within engine 10 typically undergoes a four-stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, a detailed schematic view of combustor system 199 is shown. Electrical connections are shown via dashed lines. Components including conduits or passages are shown via solid lines. Combustor system 199 may supply heated air and/or combustion gases to heat engine after treatment devices 71-73. Controller 12 may adjust operating states of valves, injectors, pumps, an igniter, and combustors to operate the combustor system 199.

Combustor system includes a combustor air pump 202 that supplied fresh air to combustor 208 via passage 250 and combustor flow control valve 204. Bypass passage or conduit 251 is arranged in parallel with combustor 208. The passage or conduit 251 allows fresh air to be mixed with output gases of combustor 208. In this way, passage or conduit 251 allows dilution and cooling of gases that exit combustor 208. Bypass flow control valve 203 controls air flow though bypass passage 251. The combustor flow control valve 204 and bypass flow control valve 203 may be cycled open and closed (e.g., modulated) to control air flow into combustor 208 and dilution/cooling of gases exiting combustor 208 before the gasses flow through three-way valve 210. The bypass valve may provide sufficient air dilution to mix with output of the combustor to maintain combustor exhaust temperature within combustor catalyst temperature thresholds under all combustor operating conditions.

The combustor system of FIG. 2 offers the advantage of adjusting a temperature of gases entering three-way valve 210 via controlling mixing of fresh air flow from air pump 202 with combustion gases that are exiting combustor 208. This may be beneficial to control a temperature of after treatment devices 214 and 216 when combustor 208 is activated (e.g., combusting fuel to generate heat).

Fuel injector 206 may provide fuel to combustor 208 for mixing with air that may be supplied via combustor air pump 202. Igniter 207 may initiate combustion within combustor 208.

Air or a combination of air and combustion gases may be delivered to three-way valve 210. Three-way valve 210 may be closed in a first position so that flow through after treatment bypass passage or conduit 254 and through combustor after treatment passage or conduit 252 is prevented. Three-way valve 210 may deliver the air and/or combustion gases to passage or conduit 252 and not passage or conduit 254 when three-way valve 210 is in a second position. Three-way valve 210 may deliver air and/or combustion gases to passage or conduit 254 and not passage or conduit 252 when three-way valve 210 is in a third position.

Passage or conduit 254 may be referred to as a combustor after treatment bypass passage or conduit. Air or combustor byproducts may be directed through passage or conduit 254 and not through combustor after treatment passage or conduit 252 during conditions where temperatures of engine after treatment devices 71-73 exceed their light-off temperatures, but where heat output of the engine is low and may not sustain temperatures of engine after treatment devices 71-73. Electric heater 212, first after treatment device 214 (e.g., a diesel oxidation catalyst or three-way catalyst), and selective reduction catalyst 216 (SCR)) are located along passage or conduit 252. After treatment devices 214 and 216 may be referred to combustor after treatment devices (e.g., combustor oxidation catalyst and combustor SCR) since they are configured to process combustor gases whereas after treatment devices 71-73 may be referred to as engine after treatment devices since they are configured to process engine exhaust gases. Passage or conduit 252 and passage or conduit 254 combine or merge into passage or conduit 198 before entering exhaust passage or conduit 185. Passage 254 may be provided to reduce a possibility of combustor catalyst degradation when combustor 208 is operating under high power/warm exhaust conditions.

Passage or conduit 252 also includes a NOx sensor 230 and a urea injector 232 which are positioned downstream of oxidation catalyst 214 and upstream of selective reduction catalyst 216. Urea injector 232 may be activated to supply urea to selective reduction catalyst 216 to increase the reduction of NOx to $N_2$ and $H_2O$. Similarly, exhaust passage or conduit 185 includes NOx sensor 236 and an optional urea injector 238. Urea injector 232 or urea injector 238 may supply urea 240 to selective reduction catalyst 73, which may be referred to as an engine selective reduction catalyst since it is configured to reduce NOx from engine 10. The passages or conduits are arranged to place combustor system 199 in parallel with engine 10. Exhaust gases and combustor gases flow in the directions indicated by the arrows that are placed along the passages or conduits.

The system of FIGS. 1 and 2 provides for an exhaust system for an internal combustion engine, comprising: a combustor air pump selectively supplying air to a combustor located along a first passage; a three-way valve positioned downstream of the combustor along the first passage; an electric heater positioned along a second passage downstream of the three-way valve; an oxidation catalyst or a three-way catalyst positioned along the second passage downstream of the electric heater; a urea injector positioned along the second passage downstream of the oxidation catalyst or the three-way catalyst; a selective reduction catalyst (SCR) positioned along the second passage downstream of the oxidation catalyst or the three-way catalyst; a third passage arranged in parallel with the second passage the third passage coupled to the second passage and entering a fourth passage, the fourth passage extending to an engine exhaust passage and positioned upstream of a group of after treatment devices in the engine exhaust passage. In a first example, the exhaust system further comprises a NOx sensor positioned along the second passage downstream of the oxidation catalyst or the three-way catalyst. In a second example that may include the first example, the exhaust system includes where the engine exhaust passage includes a second oxidation catalyst, a diesel particulate filter, and a second SCR. In a third example that may include one or both of the first and second examples, the exhaust system further comprises a second NOx sensor positioned downstream of the SCR and upstream of the second oxidation catalyst. In a fourth example that may include one or more of the first through fourth examples, the exhaust system further comprises a second urea injector positioned downstream of the SCR and upstream of the second oxidation catalyst. In a fifth example that may include one or more of the first through fourth examples, the exhaust system further comprises a controller, the controller including executable instructions stored in non-transitory memory that cause the controller to activate the electric heater, activate the combustor air pump, and adjust the three-way valve to allow air to flow in second passage and not the third passage while the internal combustion engine is not rotating. In a sixth example that may include one or more of the first through fifth examples, the exhaust system further comprises additional executable instructions that cause the controller to: deactivate the electric heater, continue operating the combustor air pump, and inject fuel to the combustor in response to a temperature of the oxidation catalyst, the three-way catalyst, or the SCR exceeding a threshold temperature while the internal combustion engine is not rotating. In a seventh example that may include one or more of the first through sixth examples, the exhaust system further comprises executable instructions that cause the controller to: inject urea to the SCR in response to output of the NOx sensor positioned alone the second passage.

Referring now to FIG. 3, an example prophetic vehicle operating sequence for a system from FIGS. 1 and 2 that is operated according to the method of FIG. 4 is shown. The operating sequence of FIG. 3 may be produced via one of the system of FIGS. 1-4 and executing instructions of the method described in FIG. 4. The plots of FIG. 3 are aligned in time and occur at the same time. Vertical markers at t0-t3 indicate times of particular interest during the sequence.

The first plot from the top of FIG. 3 is a plot of an after treatment pre-heat request (e.g., a request to pre-heat engine after treatment devices) versus time. The vertical axis represents the operating state of the after treatment pre-heat request and the after treatment pre-heat request is asserted when trace 302 is at a higher level near the vertical axis arrow. The after treatment pre-hat request is not asserted when trace 302 is at a lower level near the horizontal axis. The horizontal axis represents time and time increases from the left side of the figure to the right side of the figure. Trace 302 represents the operating state of the after treatment pre-heat request.

The second first plot from the top of FIG. 3 is a plot of engine after treatment temperature versus time. The vertical axis represents engine after treatment temperature and engine after treatment temperature increases in the direction of the vertical axis arrow. The horizontal axis represents time and time increases from the left side of the figure to the right side of the figure. Trace 304 represents the engine after treatment temperature. Dashed line 350 represents a threshold engine after treatment temperature, such as an engine SCR light-off temperature or an engine oxidation catalyst light-off temperature, where a light-off temperature is a temperature at which the after treatment device exhibits a threshold efficiency (e.g., 50 mol % conversion efficiency for a particular gas species).

The third plot from the top of FIG. 3 is a plot of combustor air pump operating state versus time. The vertical axis represents the combustor air pump state and the combustor air pump is activated when trace 306 is at a higher level near the vertical axis arrow. The combustor air pump is not activated when trace 306 is at a lower level near the horizontal axis. The horizontal axis represents time and time increases from the left side of the figure to the right side of the figure. Trace 306 represents the combustor air pump operating state.

The fourth plot from the top of FIG. 3 is a plot of electric heater operating state versus time. The vertical axis represents the electric heater operating state and the electric heater is activated when trace 308 is at a higher level near the vertical axis arrow. The electric heater is not activated when trace 308 is at a lower level near the horizontal axis. The horizontal axis represents time and time increases from the left side of the figure to the right side of the figure. Trace 308 represents the electric heater operating state.

The fifth plot from the top of FIG. 3 is a plot of combustor SCR temperature versus time. The vertical axis represents the combustor SCR temperature and the combustor SCR temperature increases in the direction of the vertical axis arrow. The horizontal axis represents time and time increases from the left side of the figure to the right side of the figure. Trace 310 represents the combustor SCR temperature. Dashed line 352 represents a threshold combustor SCR temperature, where a light-off temperature is a temperature at which the combustor SCR exhibits a threshold efficiency (e.g., 50 mol % conversion efficiency for NOx).

The sixth plot from the top of FIG. 3 is a plot of combustor operating state versus time. The vertical axis represents the combustor operating state and the combustor is activated (e.g., combusting fuel and generating heat) when trace 312 is at a higher level near the vertical axis arrow. The combustor is not activated when trace 312 is at a lower level near the horizontal axis. The horizontal axis represents time and time increases from the left side of the figure to the right side of the figure. Trace 312 represents the combustor operating state.

The seventh plot from the top of FIG. 3 is a plot of urea injector operating state versus time. The vertical axis represents the urea injector operating state and the urea injector is activated (e.g., injecting urea) when trace 314 is at a higher level near the vertical axis arrow. The urea injector is not activated when trace 314 is at a lower level near the horizontal axis. The horizontal axis represents time and time increases from the left side of the figure to the right side of the figure. Trace 314 represents the urea injector operating state.

The eighth plot from the top of FIG. 3 is a plot of engine operating state versus time. The vertical axis represents the engine operating state and the engine is activated (e.g., combusting fuel and rotating) when trace 316 is at a higher level near the vertical axis arrow. The engine is not activated when trace 316 is at a lower level near the horizontal axis. The horizontal axis represents time and time increases from the left side of the figure to the right side of the figure. Trace 316 represents the engine operating state.

At time t0, the engine is stopped and an after treatment pre-heat is not requested. The engine after treatment temperature is low and the combustor air pump is off or deactivated. The electric heater is off and the combustor SCR temperature is less than its light-off temperature. The combustor is not activated and the urea injector is not activated.

At the time t1, the engine after treatment pre-heat request is asserted, which causes the combustor air pump to be activated along with the electric heater. These actions allow heated fresh air to warm the combustor oxidation catalyst and SCR. Further, the engine after treatment devices may also be heated via the electric heater. One or more valves (not shown) (e.g., 203 and 210) may be adjusted to allow air to flow to the combustor after treatment devices. The combustor, urea injector, and engine remain off so that the engine does not generate exhaust gases. The combustor SCR temperature begins to increase and the engine after treatment device also begins to slowly increase.

At time t2, the combustor SCR temperature reaches its threshold temperature. Therefore, the electric heater is deactivated and the combustor is activated because combustor emissions may be processed and because the combustor generates more heat than the electric heater. Thus, the combustor is activated to activate the engine after treatment devices. The combustor air pump remains activated so that oxygen is provided to the combustor and so that heat may be transferred from the combustor to the engine after treatment devices. The engine after treatment device temperature begins to increase at a faster rate and the combustor SCR temperature continues to increase. The combustor SCR may tolerate higher temperatures before it may begin to degrade as compared to other emissions devices, so it may process NOx gases from the combustor and allow additional heat to be transferred to engine after treatment devices. The combustor is activated via supplying fuel to the combustor. Additionally, an ignitor at the combustor may initiate combustion within the combustor. The urea injector is also activated so that injected urea may increase the NOx conversion efficiency of the combustor SCR. The engine remains deactivated.

At time t3, the engine after treatment device temperature reaches its threshold temperature (e.g., engine after treatment light-off temperature). Therefore, the engine is started and the combustor is deactivated. The combustor air pump and urea injector are also deactivated, though an engine after treatment urea injector (e.g., 238) may be activated to increase NOx conversion efficiency of the engine after treatment SCR. The electric heater remains off and the combustor SCR temperature begins to decline since the combustor has been deactivated.

Thus, a combustor SCR temperature may be increased before an engine and a combustor are activated so that when the combustor is activated, NOx from the combustor may be processed by a SCR that is at operating temperature. The combustor SCR may be a smaller volume than the engine after treatment SCR because NOx output of the combustor is less than that of the engine and so that the combustor SCR reaches its light-off temperature sooner. Once the combustor SCR has reached its operating temperature, the combustor may be activated to increase heating of engine after treatment devices. The engine may be activated when the engine after treatment devices have reached their threshold temperatures.

Referring now to FIG. 4, a method for operating an engine, a single combustor, and engine after treatment system of the type shown in FIGS. 1 and 2 is shown. The method of FIG. 4 may be at least partially implemented as executable instructions stored in memory of one or more controllers in the system of FIGS. 1 and 2. Further, the method of FIG. 4 may include actions taken in the physical world by a controller to transform an operating state of the system of FIGS. 1 and 2. Additionally, the method of FIG. 4 may provide at least portions of the operating sequence shown in FIG. 3. Method 400 may begin when an engine of a vehicle is stopped and not rotating.

At 402, method 400 judges whether or not there has been a request to pre-heat the engine after treatment devices (e.g., 71-73 of FIG. 1). If so, the answer is yes and method 400 proceeds to 404. Otherwise, the answer is no and method 400 proceeds to exit. In one example, a request to pre-heat the engine after treatment system may be generated in preparation of vehicle activation. The request to pre-heat the engine after treatment device may be generated by a vehicle operator, cloud server, or other device. For example, the request to pre-heat the engine after treatment device may be generated in response to a person or device entering the proximity of the device or according to a scheduled vehicle departure time.

At 404, method 400 judges whether or not an engine after treatment device temperature is greater than a threshold temperature (e.g., a catalyst light-off temperature or a SCR light-off temperature). If so, the answer is yes and method 400 proceeds to 440. If not, the answer is no and method 400 proceeds to 406.

At 440, method 400 judges whether or not an engine start request has been generated. An engine start request may be generated via opening a vehicle door, turning a key, applying a pushbutton, sending a signal via an electronic device (e.g., phone, pad, etc). If method 400 judges that an engine start has been requested, the answer is yes and method 400 proceeds to 442. Otherwise, the answer is no and method 400 returns to 402.

At 442, method 400 starts the engine via cranking the engine and supplying fuel to the engine. The combustor air pump is deactivated, the electric heater is deactivated, the combustor is deactivated, and the combustor urea injector is deactivated. The combustor air pump may be electrically driven and the controller may cease electric current delivery to the combustor air pump, the electric heater (e.g., 212 of FIG. 2), cease fuel flow to the combustor, and command the combustor urea injector (e.g., 232) closed. Method 400 may activate the engine urea injector (e.g., 238 of FIG. 2) in response to output of the engine NOx sensor (e.g., 236 of FIG. 2). Since the engine after treatment temperature is greater than the engine after treatment light-off temperature, engine emissions at and after the engine restart may be processed via the engine after treatment devices. Engine exhaust gases (e.g., NOx, CO, HC) flow to the engine after treatment devices after the engine is started. Additionally, valves 203, 204, and 210 may be positioned to prevent engine exhaust gases from flowing to combustor 208 and combustor air pump 202 after the engine is started and a temperature of engine after treatment devices exceeds a threshold temperature. Method 400 proceeds to exit.

At 406, method 400 judges whether or not the combustor SCR temperature (e.g., a temperature of the combustor SCR) is greater than a threshold temperature (e.g., a light-off temperature of the combustor SCR). Alternatively, method 400 may judge whether or not the combustor oxidation catalyst temperature or a three-way catalyst temperature is greater than a threshold temperature (e.g., a light-off temperature of the combustor oxidation catalyst). If so, the answer is yes and method 400 proceeds to 408. Otherwise, the answer is no and method 400 proceeds to 430.

At 430, method 400 activates the combustor air pump and the electric heater. Method 400 may also adjust valves 204, 203, and 210 so that air flows from the combustor air pump 202 to the electric heater 212 and oxidation catalyst 214. These actions allow fresh air that has been warmed by the electric heater to warm the combustor oxidation catalyst 214, combustor SCR, and engine after treatment devices 71-73. Method 400 returns to 402.

At 408, method 400 may activate the combustor air pump (e.g., 202 of FIG. 2), deactivates the electric heater, activates the combustor (e.g., 208 of FIG. 2), and activates the combustor urea injector (e.g., 218 of FIG. 2). Method 400 may activate the combustor air pump to supply the combustor with fresh air and to push combustion gases to the combustor oxidation catalyst, combustor SCR, and engine after treatment devices. The combustor is activated to generate heat and warm the engine after treatment devices so that they may efficiently process engine exhaust gases when the engine is started. Since the combustor oxidation catalyst and combustor SCR are at their respective light-off temperatures, NOx, HC, and CO that may be generated by activating the combustor may be efficiently processed. The combustor may be activated by injecting fuel to the combustor and combusting the fuel via an igniter or existing flame. The urea injector may be activated to flow urea, a reductant, to the combustor SCR where combustor NOx may be reduced to $N_2$ and $H_2O$. The flow of urea through the urea injector may be based on or in response to output of a NOx sensor (e.g., 230 of FIG. 2). Method 400 proceeds to 410.

At 410, method 400 judges whether or not the engine SCR (e.g., 73 of FIG. 1) has reached a threshold temperature (e.g., the light-off temperature of the engine SCR). If so, the answer is yes and method 400 proceeds to 434. If not, the answer is no and method 400 proceeds to 412.

At 434, method 400 deactivates the combustor air pump, deactivates the electric heater, deactivates the combustor, and deactivates the combustor urea injector. The combustor air pump, electric heater, combustor, and urea injector are deactivated to conserve energy and urea. Method 400 returns to 402. Since the engine SCR is up to temperature, the engine may be started at 442. The combustor air pump, electric heater, and urea injector (e.g., 232 of FIG. 2). may be deactivated by ceasing to supply electric current to these devices. The combustor may be deactivated by ceasing to flow fuel to the combustor.

At 412, method 400 judges whether or not combustor SCR temperature is greater than a maximum SCR temperature threshold. If so, the answer is yes and method 400 proceeds to 414. Otherwise, the answer is no and method 400 returns to 408.

At 414, method 400 leaves the combustor air pump activated, opens the bypass valve, deactivates the electric heater, deactivates the combustor, and deactivates the urea injector (e.g., 232 of FIG. 2). The combustor is deactivated to reduce a possibility of combustor SCR degradation. Method 400 proceeds to 416.

At 416, method 400 judges whether a temperature of the combustor SCR is less than a combustor low temperature threshold. If so, the answer is yes and method 400 returns to 408 where the combustor may be reactivated. Otherwise, the answer is no and method 400 returns to 402.

In this way, method 400 may selectively activate an electric heater to activate an oxidation catalyst and a combustor SCR so that when the combustor is activated, its combustion byproducts may be treated. The combustor may be activated to heat engine after treatment devices so that when the engine is activated, engine combustion byproducts may be treated. This sequence may reduce tailpipe emissions of selected gases (e.g., HC, CO, and NOx).

Thus, the method of FIG. 4 provides for a method for operating an engine, comprising: activating a first injector via a controller to supply urea to a first selective reduction catalyst in response to activating a combustor or output of a NOx sensor in a passage downstream of the combustor, the combustor arranged in parallel with the engine; and supplying urea to a second selective reduction catalyst in response to NOx flowing to the second selective reduction catalyst, the second selective reduction catalyst arranged in an exhaust system of the engine. In a first example, the method includes where NOx flows to the second selective reduction catalyst via the engine. In a second example that may include the first example, the method includes where urea supplied to the second selective reduction catalyst is supplied via the first injector. In a third example that may include one or both of the first and second examples, the method includes where urea supplied to the second selective reduction catalyst is supplied via a second injector. In a fourth example that may include one or more of the first through third examples, the method includes where the NOx flowing to the second selective reduction catalyst is sensed via a second NOx sensor. In a fifth example that may include one or more of the first through fourth examples, the method further comprises preventing engine exhaust flow to the second selective reduction catalyst in response to a temperature of an after treatment device in the exhaust system. In a sixth example that may include one or more of the first through fifth examples, the method includes where the first injector, the first selective reduction catalyst, and the NOx sensor are positioned along the passage, and where the passage is fluidically coupled to the combustor via a three-way valve.

The method of FIG. 4 also provides for a method for operating an engine, comprising: heating an oxidation catalyst and a selective reduction catalyst via an electric heater in response to an engine start request before activating the engine and a combustor; activating the combustor in response to an oxidation catalyst temperature or a selective reduction catalyst temperature; generating heat and NOx via the combustor, the combustor arranged in parallel with the engine and coupled to the engine via a passage and an engine exhaust system; and reducing the NOx via injected urea and the selective reduction catalyst. In a first example, the method further comprises: raising a temperature of a catalyst in an engine exhaust system via the heat; starting the engine in response to the temperature exceeding a threshold temperature; and reducing engine generated NOx via a second selective reduction catalyst included in the engine exhaust system. In a second example that may include the first example, the method further comprises injecting urea upstream of the second selective reduction catalyst in response to engine generated NOx. In a third example that may include one or both of the first and second examples, the method includes where the urea is injected via an injector positioned upstream of the selective reduction catalyst. In a fourth example that may include one or more of the first through third examples, the method includes where the urea is injected via an injector positioned upstream of the second selective reduction catalyst and downstream of the selective reduction catalyst.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system for an internal combustion engine, comprising:
   a combustor air pump selectively supplying air to a combustor located along a first passage;
   a three-way valve positioned downstream of the combustor along the first passage;
   an electric heater positioned along a second passage downstream of the three-way valve;
   an oxidation catalyst or a three-way catalyst positioned along the second passage downstream of the electric heater;
   a urea injector positioned along the second passage downstream of the oxidation catalyst or the three-way catalyst;
   a selective reduction catalyst (SCR) positioned along the second passage downstream of the oxidation catalyst or the three-way catalyst;
   a third passage arranged in parallel with the second passage the third passage coupled to the second passage and entering a fourth passage, the fourth passage extending to an engine exhaust passage and positioned upstream of a group of after treatment devices in the engine exhaust passage.

2. The exhaust system of claim 1, further comprising a NOx sensor positioned along the second passage downstream of the oxidation catalyst or the three-way catalyst.

3. The exhaust system of claim 2, where the engine exhaust passage includes a second oxidation catalyst, a diesel particulate filter, and a second SCR.

4. The exhaust system of claim 3, further comprising a second NOx sensor positioned downstream of the SCR and upstream of the second oxidation catalyst.

5. The exhaust system of claim 4, further comprising a second urea injector positioned downstream of the SCR and upstream of the second oxidation catalyst.

6. The exhaust system of claim 1, further comprising a controller, the controller including executable instructions stored in non-transitory memory that cause the controller to activate the electric heater, activate the combustor air pump, and adjust the three-way valve to allow air to flow in second passage and not the third passage while the internal combustion engine is not rotating.

7. The exhaust system of claim 6, further comprising additional executable instructions that cause the controller to:
   deactivate the electric heater, continue operating the combustor air pump, and inject fuel to the combustor in response to a temperature of the oxidation catalyst, the three-way catalyst, or the SCR exceeding a threshold temperature while the internal combustion engine is not rotating.

8. The exhaust system of claim 7, further comprising executable instructions that cause the controller to:
   inject urea to the SCR in response to output of a NOx sensor positioned along the second passage.

* * * * *